United States Patent [19]

Haga et al.

[11] Patent Number: 5,030,042
[45] Date of Patent: Jul. 9, 1991

[54] MACHINING APPARATUS HAVING MEANS FOR CHANGING RADIAL POSITION OF CUTTING TOOLS

[75] Inventors: Katutoshi Haga; Hajime Mizutani; Yuuji Osawa; Akiomi Ryuu; Yutaka Matsushita; Shinobu Kaneko, all of Toyota, Japan

[73] Assignee: Fuji Seiko Limited, Aichi, Japan

[21] Appl. No.: 545,196

[22] Filed: Jun. 28, 1990

[30] Foreign Application Priority Data

Jul. 4, 1989 [JP] Japan .................. 1-172526

[51] Int. Cl.$^5$ .............................. B23B 47/00
[52] U.S. Cl. .................. 408/150; 408/158
[58] Field of Search ............ 408/150, 151, 158, 161, 408/162, 224

[56] References Cited

U.S. PATENT DOCUMENTS

| | | | |
|---|---|---|---|
| 2,820,376 | 1/1958 | Jannenga et al. | 408/151 |
| 3,254,548 | 6/1966 | Gersch | 408/150 |
| 3,640,633 | 2/1972 | Gersch et al. | 408/150 |
| 3,700,345 | 10/1972 | Schubert | 408/150 |
| 3,884,590 | 5/1975 | Skrentner et al. | 408/150 |
| 4,154,555 | 5/1979 | Skrentner | 408/150 |
| 4,602,539 | 7/1986 | Tsukiji | 408/151 |
| 4,773,799 | 9/1988 | Guironnet | 408/161 |

FOREIGN PATENT DOCUMENTS 62-92112 6/1987 Japan .

*Primary Examiner*—Daniel W. Howell
*Attorney, Agent, or Firm*—Oliff & Berridge

[57] ABSTRACT

A machining apparatus including a rotating shaft disposed rotatably about an axis thereof, an eccentric rotating member supported by the rotating shaft rotatably about an axis thereof which is offset from the axis of the rotating shaft, at least one cutting tool which is supported by the eccentric rotating member such that each cutting tool is rotated with the eccentric rotating member and such that the cutting edge of each cutting tool is offset from the axis of the eccentric rotating member, and a rotating device supported by the rotating shaft, for rotating the eccentric rotating member relative to the rotating shaft, and thereby changing the cutting edge position of each cutting tool in the radial direction of the rotating shaft.

18 Claims, 5 Drawing Sheets

MACHINING APPARATUS HAVING MEANS FOR CHANGING RADIAL POSITION OF CUTTING TOOLS

BACKGROUND OF THE INVENTION

1. Field of the Invention

The present invention relates to a machining apparatus capable of changing the radial position of cutting edges of cutting tools, and more particularly to a technique for improving the rigidity or strength of a structure for supporting the cutting tools.

2. Discussion of the Prior Art

An example of a machining apparatus wherein the radial position of cutting tool bits or inserts can be changed is disclosed in laid-open Publication No. 62-92112 of unexamined Japanese Utility Model Application. This machining apparatus includes (a) a rotating shaft rotatable about an axis thereof, (b) an eccentric sleeve which is concentrically and rotatably supported by the rotating shaft, and which has an inner circumferential surface which is eccentric with the rotating shaft, (c) a tool holder which rotatably engages the inner circumferential surface of the eccentric sleeve and which is prevented from being rotated relative to the rotating shaft, (d) cutting tool bits carried by the tool holder such that the cutting edges of the tool bits are offset from the axis of the rotating shaft, and (e) a rotating device supported by the rotating shaft, for rotating the eccentric sleeve relative to the rotating shaft. In this machining apparatus, the tool holder engaging the eccentric sleeve is moved in the radial direction of the rotating shaft, when the eccentric sleeve is rotated by the rotating device relative to the rotating shaft. As a result, the position of the tool bits is changed in the radial direction of the rotating shaft.

However, the eccentric sleeve through which the tool holder is supported by the rotating shaft tends to reduce the strength or rigidity of the support structure for the tool bits, resulting in easy occurrence of strains or vibrations due to a cutting resistance during a machining operation. Thus, the conventional machining apparatus is limited in the machining accuracy and is not sufficiently capable of performing a heavy-duty machining operation.

SUMMARY OF THE INVENTION

It is therefore an object of the present invention to provide a machining apparatus wherein cutting tools are easily adjusted in the radial position with respect to the rotating shaft and are stably supported by a rigid support structure.

The above object may be achieved according to the principle of the present invention, which provides a machining apparatus including (a) a rotating shaft disposed rotatably about an axis thereof, (b) an eccentric rotating member supported by the rotating shaft rotatably about an axis thereof which is offset from the axis of the rotating shaft, (c) at least one cutting tool which is supported by the eccentric rotating member such that each cutting tool is rotated with the eccentric rotating member and such that a cutting edge of each cutting tool is offset from the axis of the eccentric rotating member, and (d) a rotating device supported by the rotating shaft, for rotating the eccentric rotating member relative to the rotating shaft, and thereby changing the cutting edge position of each cutting tool in the radial direction of the rotating shaft.

In the machining apparatus of the present invention constructed as described above, rotation of the eccentric rotating member by the rotating device relative to the rotating shaft will cause the position of the cutting edge of each cutting tool to be changed in the radial direction of the rotating shaft, because the eccentric rotating member is eccentric with respect to the rotating shaft. In other words, since the axis of the eccentric rotating member is offset from the axis of the rotating shaft, the rotation of each cutting tool with the eccentric rotating member will cause a gradual change in the radial position of the cutting edge of the tool.

According to the present machining apparatus, the cutting edge position of each cutting tool is readily changed in the radial direction of the rotating shaft, as in the conventional apparatus. Further, the absence of an eccentric sleeve between the eccentric rotating member and the rotating shaft results in an increase in the strength or rigidity of the support structure for the cutting tool or tools. Each cutting tool is attached directly to the eccentric rotating member, or attached to a tool holder which is secured to the eccentric rotating member. In the latter case, too, the support structure for the tool or tools provides a sufficiently high degree of strength or rigidity, since the tool holder and the eccentric rotating member can be firmly fixed to each other to provide a rigid support for the tools. Accordingly, the present machining apparatus is less likely to be subject to strains or vibrations due to a cutting resistance, and assures improved machining accuracy even in a heavy-duty machining operation. Further, the elimination of the conventionally used eccentric sleeve simplifies the construction of the apparatus and accordingly lowers the cost of manufacture of the apparatus.

The rotating shaft may include a main spindle driven by a drive source, an adapter secured to one end of the main spindle, and a casing secured to the adapter, for rotatably supporting the eccentric rotating member.

The rotating device may include a rod having a first threaded portion which is eccentric with the rotating shaft and concentric with the eccentric rotating member. This first threaded portion engages a second threaded portion provided on the eccentric rotating member, such that movements of the rod in an axial direction of the rotating shaft cause rotating movements of the eccentric rotating member about the axis thereof. For example, the first threaded portion consists of an externally threaded portion of the rod, while the second threaded portion consists of an internally threaded portion of the eccentric rotating member. These threaded portions may be multiple-start threads, so as to provide a large lead.

In one form of the invention, the rod is rotatably supported by the main spindle such that another portion of the rod different from the eccentric threaded portion extends through the center bore movably in an axial direction of the main spindle and such that the rod is rotated with the main spindle.

In another form of the invention, the rotating device includes one of a nut and a screw which is rotated by a drive source, and the rod is provided with the other of the nut and screw which engages the member rotated by the drive source, so that rotation of the nut or screw by the drive source causes movements of the rod in the axial direction of the rotating shaft, to thereby cause the first threaded portion of the rod to rotate the eccentric rotating member. The above-indicated one of the nut and screw is rotatably and axially immovably connected to the rod, and the drive source is supported by a stationary member.

The at least one cutting tool supported by the eccentric rotating member may be a plurality of tool bits whose cutting edges are offset from the axis of the eccentric rotating member. For instance, the tool bits may consist of two inserts which are attached to the eccentric rotating member such that faces of the two inserts lie substantially in a plane which includes the axis of the eccentric rotating member. The tool bits may be positioned on a tool holder, in a desired manner. For example, the tool bits are positioned such that at least one cutting edge of the tool bits is brought into a machining position when the eccentric rotating member is rotated to a first angular position relative to the rotating shaft, and the cutting edge or edges of the tool bits which is/are brought into the machining position at the first angular position of the eccentric rotating member is/are brought into a non-machining position when the eccentric rotating member is rotated to a second angular position different from the first angular position. In this case, at least one cutting edge of the tool bits which is not brought into the machining position at the first angular position of the eccentric rotating member may be brought into a machining position when the eccentric rotating member is rotated to the second angular position. Alternatively, the tool bits may be positioned on the tool holder such that a cutting edge of one of the tool bits and a cutting edge of another of the tool bits are brought into a machining position when the eccentric rotating member is rotated to the first angular position, and at least one cutting edge of the tool bits which is different from the cutting edges which are brought to the machining position at the first angular position is brought into the machining position when the eccentric rotating member is rotated to a second angular position different from the first angular position. Further, the tool bits may be positioned on the tool holder such that at least one cutting edge of the tool bits which is brought into a machining position when the eccentric rotating member is rotated to the first angular position is brought into the non-machining position when the eccentric rotating member is rotated to the second angular position, but none of the cutting edges of the tool bits are brought into the machining position at the second angular position.

A feeding device may be provided for feeding the rotating shaft in an axial direction thereof to thereby feed the cutting tool or tools. The feeding device may include a slide on which the rotating shaft is rotatably mounted, a drive mechanism connected to the slide, and a drive source for operating the drive mechanism for feeding the slide.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
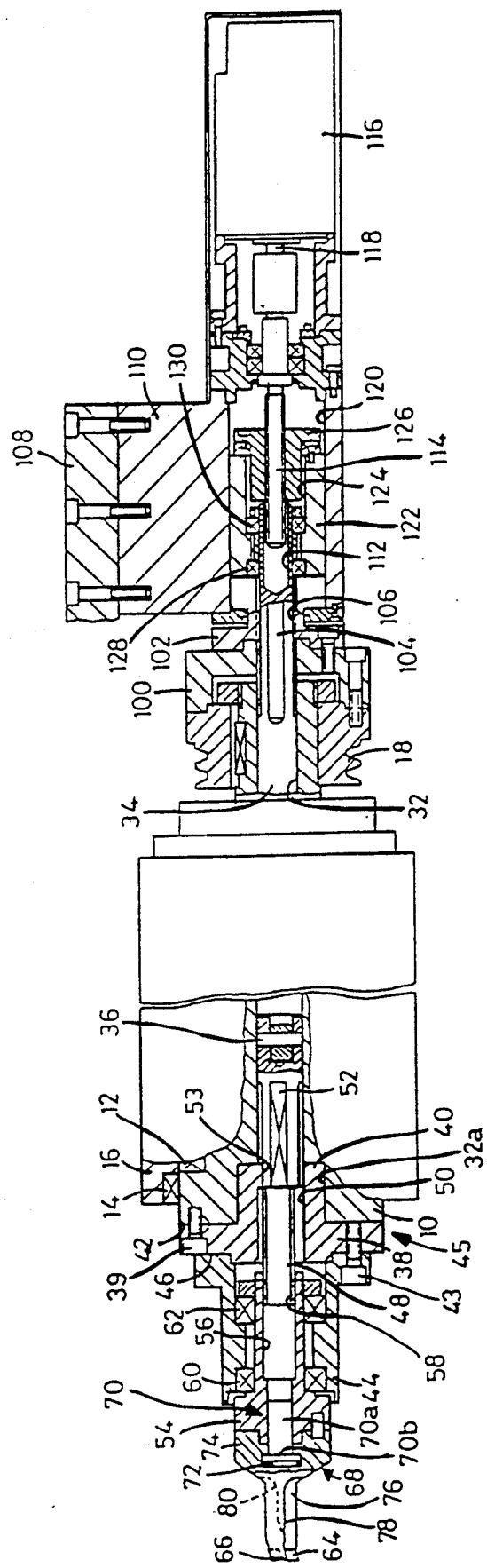
FIG. 1 is an elevational view in cross section showing a part of a drilling and boring apparatus constructed according to one embodiment of the present invention.

Referring first to FIG. 1, reference numeral 10 designates a main spindle of a machining apparatus adapted to perform drilling and boring operations. The main spindle 10 is rotatably supported by a housing 16 via a bearing 12, a sealing member 14 and other members. The rear end portion of the main spindle 10 projects from the rear end of the housing 16, and is provided with a V-pulley 18 fixed thereto for rotation with the main spindle 10.

Figure 2:
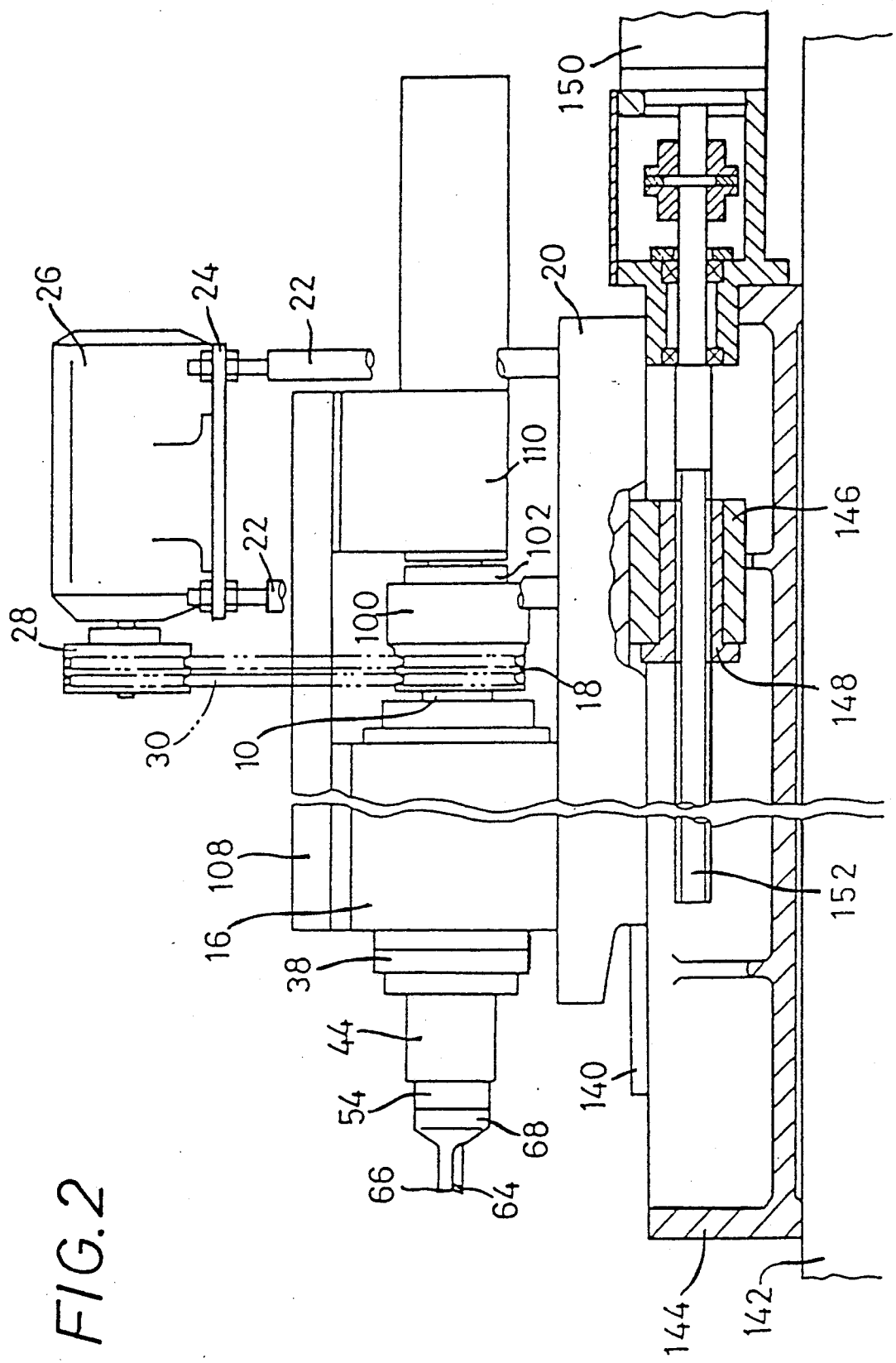
FIG. 2 is a front elevational view partly in cross section showing the entirety of the apparatus of FIG. 1.

Referring also to FIG. 2, the housing 16 is mounted on a slide 20 whose rear portion has a mounting plate 24 for mounting a spindle drive motor 26. The mounting plate 24 is retained by bolts 22 on the rear portion of the slide 20, such that the vertical position of the plate 24 is adjustable. The V-pulley 18 of the main spindle 10 is connected by a V-belt 30 to a V-pulley 28 fixed to the output shaft of the motor 26, so that the driven V-pulley 18 and the main spindle 10 are rotated by the spindle motor 10 via the driving V-pulley 28 and the belt 30.

The main spindle 10 has a center bore 32 formed therethrough in the axial direction, and a rod 34 is axially movably received in the center bore 32. The rod 34 consists of two shaft members which are connected to each other by a pin 36. The front end portion of the center bore 32 is counterbored as indicated at 32a, and has a larger diameter than the remaining portion of the bore 32. An adapter 38 is bolted to a front end face 42 of the main spindle 10, such that a boss 40 of the adapter 38 is fitted in the counterbored front end portion 32a of the center bore 32. Further, a cylindrical casing 44 is bolted to a front end face 46 of the adapter 38. Thus, the adapter 38 and the cylindrical casing 44 cooperate with the main spindle 10 to constitute a rotating shaft 45 of the present drilling and boring apparatus.

The rod 32 has an externally threaded front end portion 48 whose axis is eccentric by a suitable radial distance with respect to the axis of rotation of the main spindle 10 (rotating shaft 45). The externally threaded front end portion 48 extends through a stepped through-hole 50 formed axially through the adapter 38, and projects into the casing 44. The threaded front end portion 48 has a multiple-start thread such as a quadruple thread, which has a large lead (e.g., four times the pitch, in the case of the quadruple thread). Adjacent to the axially inner end of the externally threaded front end portion 48 of the rod 32, there are provided four chamfered portions 52 which engage respective four flat surfaces of a rectangular portion 53 of the through-hole 50 of the adapter 38, so that the rod 32 is rotated with the adapter 38 (with the rotating shaft 45).

An eccentric rotating member 54 is rotatably supported by the rotating shaft 45, more precisely, by the cylindrical casing 44, via bearings 60, 62 such that the eccentric rotating member 54 is rotatable about the axis of rotating of the externally threaded front end portion 48 of the rod 32. Thus, the rotating member 54 is eccentric with respect to the rotating axis of the main spindle 10, by the same radial amount as the threaded front end portion 48. The eccentric rotating member 54 has a through-hole 56 formed axially therethrough. The through-hole 56 has an internally threaded end portion 58 on the side of the adapter 38. The internally threaded end portion 58 has also a multiple-start thread. The externally threaded front end portion 48 of the rod 32 engages the internally threaded end portion 58 of the eccentric rotating member 54, so that the eccentric rotating member 54 is rotated bidirectionally about its axis (offset from the axis of the spindle 10) when the threaded end portion 48 of the rod 32 is axially moved in opposite directions.

To the eccentric rotating member 54, there is fixed a tool holder 68 which carries two cutting tools in the form of inserts 64, 66 retained at the tip by suitable means. More specifically, the tool holder 68 is removably attachable to the eccentric rotating member 54, by means of a connecting member 70 which has a stem 70a, and a head 70b having a toothed peripheral configuration. The stem 70a engages the end portion of the through-hole 56 of the eccentric rotating member 54 remote from the internally threaded end portion 5 8, while the head 70b engages an engaging hole 72 formed in the tool holder 68. The engaging hole 72 has a toothed configuration similar to that of the head 70b of the connecting member 70, so that the head 70b is axially movable toward and away from the bottom of the engaging hole 72 when the head 70b and the hole 72 have a given relative angular or circumferential phase. This arrangement permits the head 70b of the connecting member 70 to be engageable and disengageable with the hole 72 of the tool holder 68, by axially moving and rotating the connecting member 70 and the tool holder 68 relative to each other. The eccentric rotating member 54 is provided with a drawing mechanism (not shown) for pulling in the connecting member 70 while the head 70b engages the engaging hole 72 of the tool holder 68. Thus, the tool holder 68 may be removably attached to the eccentric rotating member 54, so that the tool holder 68 is rotated with the eccentric rotating member 54.

Figure 3:
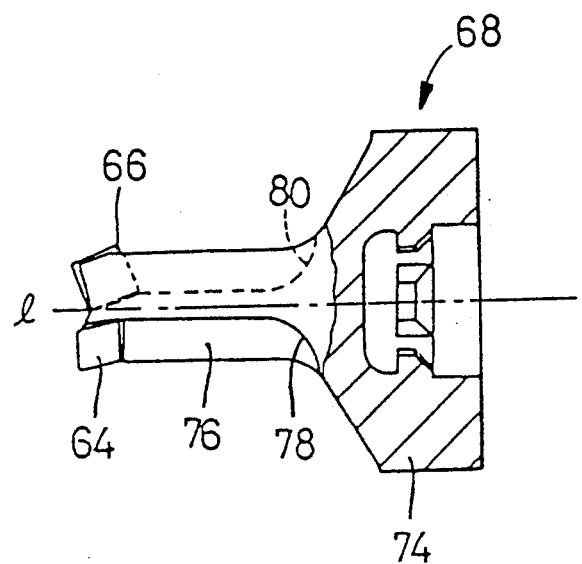
FIG. 3 is an elevational view partly in cross section of a tool holder of the apparatus.
Figure 4:
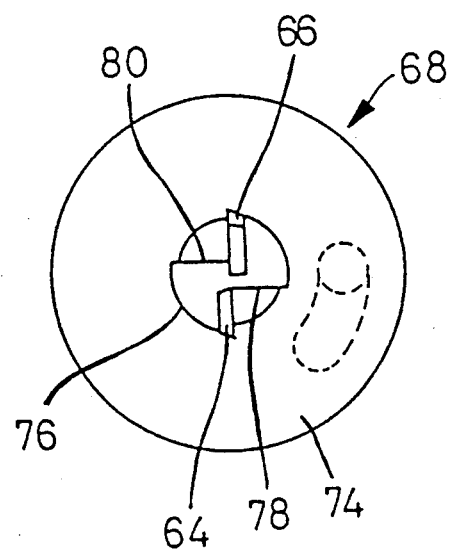
FIG. 4 is an end view of the tool holder of FIG. 3.

As shown in enlargement in FIGS. 3 and 4, the inserts 64, 66 are secured to the tip of a small-diameter holding portion 76 which extends from a body 74 of the tool holder 68. The holding portion 76 has two chip-removing grooves 78, 80 formed in the outer circumferential surface, for facilitating the removal of the cutting chips produced by the inserts 64, 66. The inserts 64, 66 are positioned such that their faces (cutting or rake faces) lie substantially in a plane which includes the axis 1 of the tool holder 68.

To the rear end face of the drive V-pulley 18, there is fixed a casing 100 to which another casing 102 is fixed. The rear end portion of the rod 34 has four chamfered portions 104 which engage respective flat surfaces of a rectangular hole 106 formed through the casing 102, so that the rod 34 is rotated with the main spindle 10. The casing 102 rotatably engages a casing 110 which is secured to an arm 108 that rearwardly extending from the housing 16, as shown in FIG. 2.

The rod 34 has an axial hole 112 formed through its rear end portion, while the casing 110 has a through-hole 120 axially formed therethrough. In the through-hole 120, there is slidably received a movable member 122 which has an axial hole 124. A nut 126 is fixed to the rear end of the movable member 122 such that a considerable portion of the nut 126 is accommodated in the axial hole 124. The movable member 122 rotatably supports the rod 34 via bearings 128, 130, at its front end portion such that the rod 34 is axially movable with the movable member 122. The nut 126 engages a lead screw 114, such that the front end portion of the screw 114 projects into the axial hole 112 of the rod 34. The lead screw 114 is connected to an output shaft 118 of a motor 116 disposed rearwardly of the casing 110.

When the lead screw 114 is rotated by the motor 116, the nut 126 and the movable member 122 are axially moved within the through-hole 120 of the casing 110, whereby the rod 34 is axially moved. An advancing movement of the rod 34 will cause the eccentric rotating member 54 and the tool holder 68 to be rotated in one direction, thereby moving the insert 64 in the radially outward direction of the main spindle 10 (rotating shaft 45). While the eccentric rotating member 54 is rotated through 180°, the insert 64 takes its radially outermost position. In this position of the insert 64, the insert 66 takes its radially innermost position nearest to the axis of rotation of the spindle 10. In the angular positions of the tool holder 68 corresponding to the opposite ends of the 180° rotating movement of the eccentric rotating member 54, the tips of the inserts 64, 66 lie in a plane which includes the axes of rotation of the spindle 10 and eccentric rotating member 54. The distance of radial movement of the inserts 64, 66 as a result of the 180° rotating movement of the tool holder 68 (eccentric rotating member 54) is twice the amount of eccentricity of the eccentric rotating member 54 (amount of offset between the axes of the spindle 10 and eccentric rotating member 54).

A retracting movement of the rod 34 will cause the eccentric rotating member 54 and tool holder 68 to be rotated in the reverse direction, thereby moving the insert 64 in the radially inward direction of the spindle 10, while moving the insert 66 in the radially outward direction.

It will be understood that the lead screw 114, motor 116, movable member 122, nut 126, rod 34 and other members constitute a rotating device for rotating the eccentric rotating member 54 relative to the main spindle 10.

As shown in FIG. 2, the slide 20 on which the housing 16 is mounted is slidable on guide rails 140 which are formed on a support 144 so as to extend in the direction parallel to the axis of the main spindle 10. The support 144 rests on a base 142 of the apparatus. The slide 20 has a bracket 146 fixed to the underside, and a nut 148 supported by the bracket 146. The nut 148 engages a feedscrew 152 which is rotatably supported by the support 144 and which is driven by a feed motor 150. With the feedscrew 152 rotated by the feed motor 150, the slide 20 is fed on the guide rails 140, whereby the housing 16 is moved in the axial direction of the spindle 10. Thus, the slide 20, support 144 with the guide rails 140, nut 148, motor 150, feedscrew 152 and other members constitute a feeding device for feeding the cutting tools in the form of the inserts 64, 66 in the axial direction of the spindle 10, together with the housing and the rotating shaft 45 (spindle 10, adapter 38 and casing 44).

Figure 5:
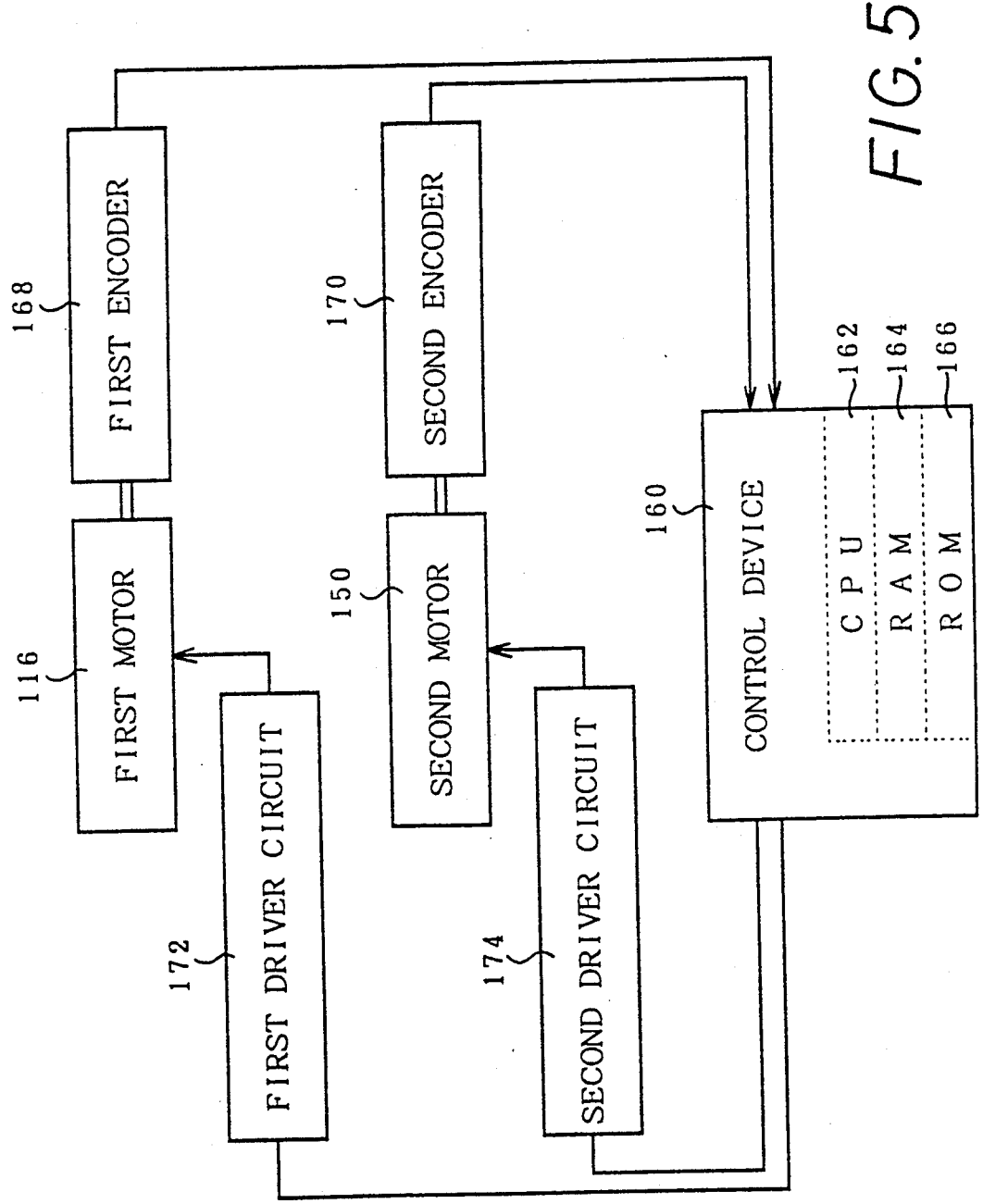
FIG. 5 is a schematic block diagram illustrating an electric control system of the apparatus.

The motors 116 and 150 are operated under the control of a control device as indicated at 160 in FIG. 5. The control device 160 includes a central processing unit (CPU) 162, a random-access memory (RAM) 164 and a read-only memory (ROM) 166. A first and a second encoder 168, 170 are provided to detect amounts of operation of the motors 116, 150, respectively, and the motors 116, 150 are operated through respective first and second drivers 172, 174. The encoders 168, 170 and the drivers 172, 174 are connected to the control device 160, so that the drivers 172, 174 are controlled such that the amounts of operation of the motors 116, 150 detected by the respective encoders 168, 170 coincide with predetermined amounts of operation commanded by the control device 160.

Figure 6:
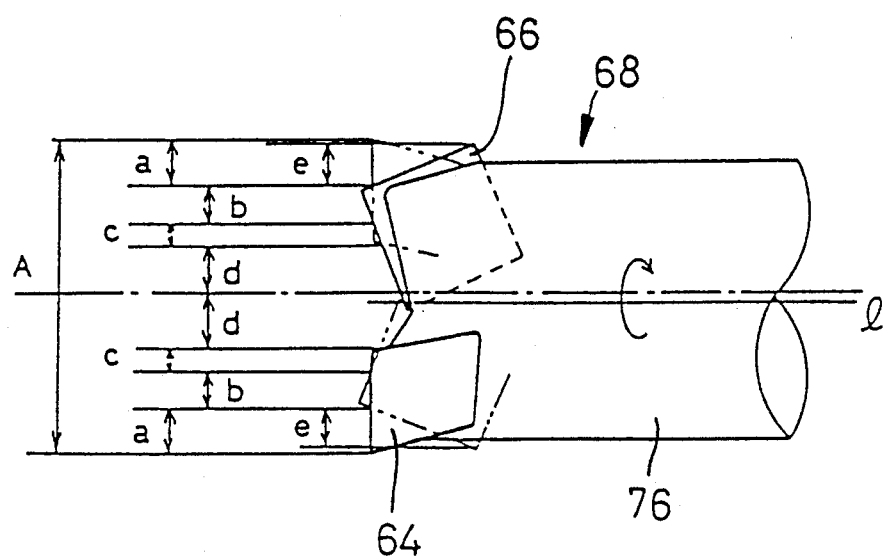
FIGS. 6 and 7 are enlarged views showing tool inserts held by the tool holder of FIGS. 3 and 4.

When the drilling and boring apparatus constructed as described above is operated to perform drilling and boring operations, appropriate machining data necessary for the drilling and boring operations are entered into the RAM 164 of the control device 160, so that the motors 116, 150 are operated according to the entered machining data, to effect the drilling and boring operations, while feeding the inserts 64, 66 in the axial direction of the main spindle 10, and moving the inserts 64, 66 in the radial direction. That is, a drilling operation is performed while the cutting tool bits or inserts 64, 66 are fed with the spindle 10 in the forward or advancing direction by the feeding device 20, 144, 148, 150, 152. To this end, the inserts 64, 66 are first brought to the appropriate radial positions for the drilling operation, by rotating the eccentric rotating member 54 by an appropriate angle by the rotating device 114, 116, 122, 126, 34. Namely, the insert 64 is positioned on the same side of the axis l of the tool holder 68, with respect to the axis (indicated by one-dot chain line) of the spindle 10 or rotating shaft 45, while the insert 66 is positioned on the other side with respect to the axis of the spindle 10, as indicated in FIG. 6. In this condition, the diameter of the path described by the tip of the insert 64 during rotation of the spindle 10 is larger than that of the insert 66. More specifically described by reference to the identification of cutting edges of the inserts 64, 66 in FIG. 6, a radially outermost cutting edge "e" of the insert 66 is located at a more radially inner and a more axially retracted position, than a radially outermost cutting edge "a" of the insert 64. Accordingly, the cutting edge "e" of the insert 66 will not be engaged in a drilling cut. The drilling cut is performed by the cutting edge "a" and a cutting edge "c" of the insert 64, and cutting edges "b" and "d" of the insert 66.

Figure 7:
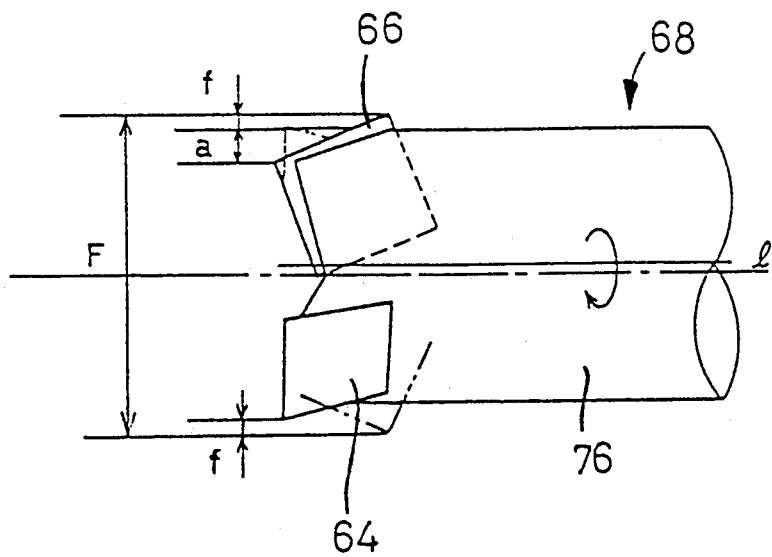

After the inserts 64, 66 have been advanced to the predetermined depth of a hole to be drilled, the inserts 64, 66 are retracted or fed in the reverse direction by the feeding device, for boring the drilled hole. To this end, the eccentric rotating member 54 is rotated in the reverse direction to bring the inserts 64, 66 to their boring position. That is, the insert 66 is positioned on the same side of the axis ( of the tool holder 68 with respect to the axis of the spindle 10, while the insert 64 is positioned on the other side with respect to the axis of the spindle 10, as indicated in FIG. 7, so that a cutting edge "f" of the insert 66 is positioned radially outward of the cutting edge "a" of the insert 64. Accordingly, a diameter "F" of the path described by the cutting edge "f" of the insert 66 during the reverse feeding of the inserts 64, 66 (during the boring operation) is larger than a diameter "A" of the path described by the cutting edge "a" of the insert 64 during the forward feeding (during the drilling operation), whereby the boring operation is effected by the cutting edge "f" of the insert 66 while the spindle 10 (rotating shaft 45) is fed in the reverse direction.

As described above, the present machining apparatus is adapted to effect a drilling operation and a boring operation during one reciprocation of the main spindle 10. Since the cutting edges of the insert 66 used for the drilling operation are different from the cutting edge of the same insert 66 used for the boring operation, the amount of wear of the insert 66 is reduced and the initial boring accuracy of the insert 66 is maintained for a long time, as compared with those obtained where the same cutting edges are used for both the drilling operation and the boring operation.

While the different cutting edges of the inserts 64, 66 are used for the drilling and boring operations, different machining operations may be performed by respective different inserts if the tool holder 68 has a sufficient space for holding these inserts In the illustrated embodiment, the radial positions of the inserts 64, 66 are changed upon completion of the forward drilling operation, to effect the boring operation during the reverse movement of the spindle 10. However, the principle of the present invention may be practiced to retract the inserts from the machining position to the non-machining position in the radially inner direction after a forward machining operation, in order to prevent the inserts from contacting the machined surface of the workpiece during a rapid return of the inserts to the home position. Further, the principle of the present invention is applicable to a machining apparatus wherein the radial positions of the inserts are adjusted for compensation for wear of the cutting edges of the inserts.

Although the main spindle 10 is provided with the device for rotating the eccentric rotating member 54 and the tool holder 68, a rotating device may be provided on a rotating shaft which is removably mounted on the main spindle of the machine tool.

In the illustrated embodiment, the rod 32 has the eccentric externally threaded portion 48 while the eccentric rotating member 54 has the internally threaded end portion 58. However, the rod 32 may have an eccentric internally threaded portion which engages an externally threaded end portion of the eccentric rotating member 54. Similarly, a nut may be driven by the motor 116, while the rod 32 is provided with a screw which engages the nut driven by the motor 116.

The inserts 64, 66 may be directly attached to the eccentric rotating member 54. Further, the cutting tools used for the machining apparatus are not limited to the inserts as illustrated above. For instance, tool bits attached to or formed on boring bars maY be mounted on a tool holder or eccentric rotating member 54, or cutting blades may be directly attached to the tool holder or eccentric rotating member.

The present invention may apply to any machining apparatus adapted to perform machining operations other than drilling and boring.

It will be understood that the invention may be embodied with various other changes, modifications and improvements, which may occur to those skilled in the art, in the light of the foregoing teachings.

What is claimed is:

1. A machining apparatus comprising:
 a rotating shaft disposed rotatably about an axis thereof;
 an eccentric rotating member supported by said rotating shaft rotatably about an axis thereof which is offset from said axis of said rotating shaft;
 a tool holder secured to said eccentric rotating member such that said tool holder is concentric with said eccentric rotating member;
 a plurality of tool bits which are supported by said tool holder such that said tool bits are rotated with said tool holder and such that cutting edges of said tool bits are offset from the axis of said eccentric rotating member; and a rotating device supported by said rotating shaft, for rotating said eccentric rotating member relative to said rotating shaft, and thereby changing a position of said cutting edge of said tool bits in a radial direction of said rotating shaft, said plurality of tool bits being positioned on said tool holder such that a cutting edge of one of said tool bits and a cutting edge of another of said tool bits are brought into a machining position when said eccentric rotating member is rotated to a first angular position relative to said rotating shaft, and at least one cutting edge of said tool bits which is different from the cutting edges which are brought to said machining position at said first angular position is brought into a machining position when said eccentric rotating member is rotated to a second angular position different from said first angular position.

2. A machining apparatus according to claim 1, where said tool holder is removably attached to said eccentric rotating member, and said tool bits are attached to said tool holder.

3. A machining apparatus according to claim 1, further comprising a drive source, and wherein said rotating shaft comprises a main spindle driven by said drive source, an adapter secured to one end of said main spindle, and a casing secured to said adapter, said eccentric rotating member being rotatably supported by said casing.

4. A machining apparatus according to claim 1, wherein said rotating device comprises a rod having a first threaded portion which is eccentric with said rotating shaft and concentric with said eccentric rotating member, said eccentric rotating member having a second threaded portion which engages said first threaded portion of said rod such that movements of said rod in an axial direction of said rotating shaft cause rotating movements of said eccentric rotating member about the axis thereof.

5. A machining apparatus according to claim 4, wherein said first threaded portion consists of an externally threaded portion of said rod, while said second threaded portion consists of an internally threaded portion of said eccentric rotating member.

6. A machining apparatus according to claim 5, wherein each of said externally threaded portion and said internally threaded portion has a multiple-start thread.

7. A machining apparatus according to claim 4, wherein said rotating shaft comprises a main spindle having a center bore, and said rod has another portion concentric with said center bore, said rod being supported at said another portion by said main spindle such that said rod extends movably through said center bore in an axial direction of the main spindle and such that said rod is rotated with said main spindle.

8. A machining apparatus according to claim 4, wherein said rotating device further comprises a drive source, and one of a nut and a screw which is connected to said drive source, and said rod is provided with the other of said nut and said screw which engages said one of the nut and the screw, so that rotation of said one of the nut and the screw by said drive source causes movements of said rod in the axial direction of said rotating shaft, to thereby cause said first threaded portion of said rod to rotate said eccentric rotating member.

9. A machining apparatus according to claim 8, wherein said other of said nut and said screw is rotatably and axially immovably connected to said rod, and said drive source is supported by a stationary member.

10. A machining apparatus according to claim 1, wherein said plurality of tool bits consist of two inserts which are attached to said eccentric rotating member such that faces of said two inserts lie substantially in a plane which includes the axis of said eccentric rotating member.

11. A machining apparatus according to claim 1, wherein said plurality of tool bits are positioned on said tool holder such that at least one cutting edge of said tool bits is brought into a machining position when said eccentric rotating member is rotated to a first angular position relative to said rotating shaft, and said at least one cutting edge of said tool bits which is brought into said machining position at said first angular position of said eccentric rotating member is brought into a non-machining position when said eccentric rotating member is rotated to a second angular position different from said first angular position.

12. A machining apparatus according to claim 11, wherein at least one cutting edge of said tool bits which is not brought into said machining position at said first angular position of said eccentric rotating member is brought into a machining position when said eccentric rotating member is rotated to said second angular position.

13. A machining apparatus according to claim 1, wherein said plurality of tool bits are positioned on said tool holder such that at least one cutting edge of said tool bits which is brought into a machining position when said eccentric rotating member is rotated to a first angular position is brought into a non-machining position when said eccentric rotating member is rotated to a second angular position different from said first angular position, none of the cutting edges of said tool bits being brought into the machining position at said second angular position.

14. A machining apparatus according to claim 1, further comprising a feeding device for feeding said rotating shaft in an axial direction thereof to thereby feed said at least one cutting tool.

15. A machining apparatus according to claim 14, wherein said feeding device comprises a slide on which said rotating shaft is rotatably mounted, a drive mechanism connected to said slide, and a drive source for operating said drive mechanism for feeding said slide.

16. A machining apparatus comprising:
a rotating shaft disposed rotatably about an axis thereof;
a tool holding structure supported by said rotating shaft;
a plurality of tool bits which are supported by said tool holding structure such that cutting edges of said tool bits are offset from said axis of said tool holding structure; and
a position changing device for moving said tool holding structure with respect to the axis of said rotating shaft, for changing a radial position of the cutting edges of said tool bits in a radial direction of said rotating shaft,
said plurality of tool bits being positioned on said tool holding structure such that a cutting edge of one of said tool bits and a cutting edge of another of said tool bits are brought into a machining position when said tool holding structure is moved to a first position, and at least one cutting edge of said tool bits which is different from the cutting edges which are brought to said machining position at said first position is brought into a machining position when said tool holding structure is moved to a second position different from said first position.

17. A machining apparatus according to claim 16, wherein said tool holding structure comprises an eccentric rotating member supported by said rotating shaft rotatably about an axis thereof which is offset from said axis of said rotating shaft, said tool bits being supported by said eccentric rotating member such that said tool bits are rotated with said eccentric rotating member and such that the cutting edges of said tool bits are offset from said axis of said eccentric rotating member, and wherein said position changing device comprises a rotating device supported by said rotating shaft, for rotating said eccentric rotating member relative to said rotating shaft, selectively to a first and a second angular position as said first and second positions of said tool holding structure.

18. A machining apparatus according to claim 17, wherein said tool holding structure further comprises a tool holder secured to said eccentric rotating member such that said tool holder is concentric with said eccentric rotating member, said tool bits being attached to said tool holder.

* * * * *